Sept. 10, 1957  A. E. SCHLUETER  2,805,658
MULTI-GRILL BARBECUE ROBOT
Filed Sept. 27, 1954

INVENTOR
Arthur E. Schlueter

2,805,658
MULTI-GRILL BARBECUE ROBOT

Arthur E. Schlueter, Lakeland, Fla.

Application September 27, 1954, Serial No. 458,417

1 Claim. (Cl. 126—30)

This invention relates to barbecue grills.

It is an object of the present invention to provide a device adapted to be mounted adjacent an outdoor barbecue which includes a plurality of vertically spaced, vertically adjustable grills which may be rotated to an operative position directly above the pit and upon the food being cooked may be swung away from the hot pit to a position directly over a table or the like from which the prepared food may be served.

It is another object of the present invention to provide a device of the above type which includes a telescopic arm which may be rotated over and away from the barbecue pit and which releasably supports at the outer end thereof a hood adapted to cover the grills, a smaller sized hood being provided for the grills and a larger sized hood provided to shelter the entire barbecue pit when it rains and which may also be swung around over a table or the like to serve as an umbrella.

Other objects of the present invention are to provide a multi-grill barbecue robot bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which.

Figure 1:
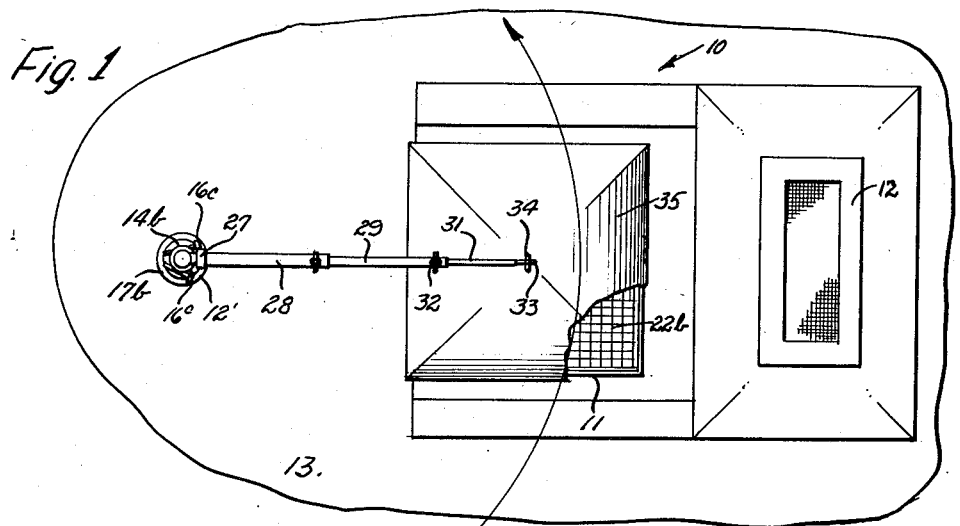
Figure 1 is a top plan view of a preferred embodiment of the invention shown in operative use over an outdoor barbecue pit with the hood member shown broken away to disclose the grills therebelow.

Referring now more in detail to the drawing, 10 indicates generally an outdoor barbecue pit of conventional design including the hot pit 11 and the chimney 12, substantially as illustrated.

In the practice of my invention, a hollow cylindrical standard 12' is sunk into the ground 13 on either side of the barbecue pit 10 and telescopically receives through its open upper end a second hollow cylindrical member 14.

The member 14 is provided with a plurality of vertically spaced converging pairs of openings 15 into which a pair of pins 16 may be selectively inserted whereby to support the hollow member 14 within the member 12' in a plurality of vertically adjustable positions, the pins 16 extending beyond the member 14 and engaging the upper edges of the member 12'.

A collar 17 is secured in suitable manner to the upper end of the member 14 and is integrally formed with a horizontal extension 18 which serves to mount a cup-shaped member 19 within which is suitably secured a horizontal length of hollow tubing 20.

It will be noted that the pins 16 support the member 14 within the member 12' while at the same time permitting the rotational movement of the member 14 about a vertical axis for a purpose which will hereinafter become clear.

An elongated rod 21 is slidably received within the open end of the tubular member 20 and fixedly carries at its outer end a grill or grating 22 adapted to overlie the pit 11. The longitudinal adjustment of the rod 21 within the tubular member 20 is effected by means of a set screw 22' screw threaded through the tubular member and adapted to bear directly on the rod 21 when in a tightened position.

A third hollow cylindrical member 14a fits downwardly within the tubular member 14 and is provided with a vertically spaced pair of converging openings 15a which selectively receive therethrough the pins 16a whereby to support the member 14a within the member 14 in a plurality of vertically adjustable positions, the pins 16a engaging the upper edge of the collar 17, while permitting the rotation of the member 14a therewithin. A collar 17a is suitably secured to the upper end of the member 14a and supports a cup-shaped member 19a which secures therewithin one end of a hollow tubular member 20a. A rod 21a is slidable within the tubular member 20a and fixedly mounts at its free end a second grill or grating 22a, the rod 21a being locked longitudinally within the tubular member 20a by means of the set screw 22'.

A fourth hollow cylindrical member 14b is adapted to fit downwardly within the member 14a, being supported therewithin in a plurality of vertically spaced openings by means of the vertically spaced pairs of converging openings 15b which selectively receive therethrough the pins 16b. A collar 17b is suitably secured to the upper end of the member 14b and serves to mount the cup-shaped member 19b which secures therewithin one end of the horizontal tubular member 20b. An elongated rod 21b slidable within the tubular member 20b has secured to its free end a third grill or grating 22b, the position of the rod 21b longitudinally within the tubular member 20b being locked by means of the set screw 22'.

Figure 2:
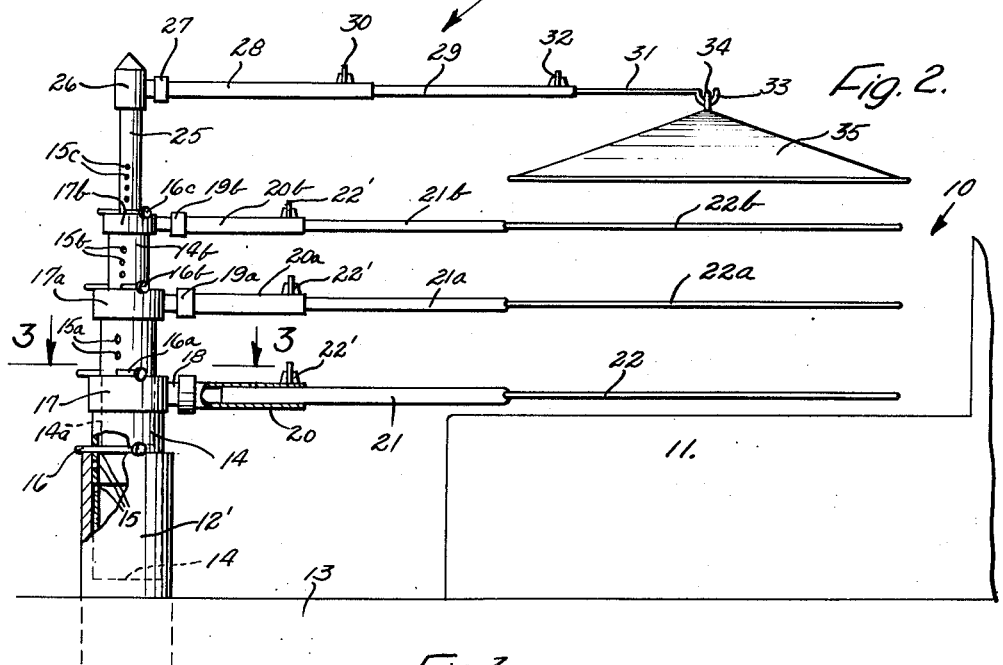
Fig. 2 is a side elevational view thereof shown partly broken away to disclose the interior construction and Fig. 3 is a transverse sectional view taken along the line 3—3 of Fig. 2.
Figure 3:
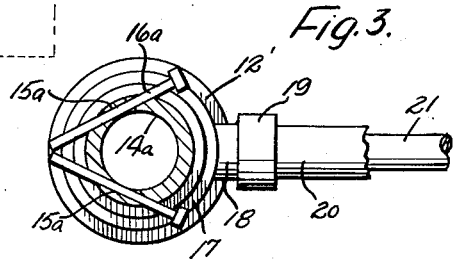

A fifth hollow cylindrical member 25 is received within the member 14b, being supported therewithin a plurality of vertically adjustable positions by means of the vertically spaced pairs of converging openings 15c and the pins 16c. A collar 26 is suitably secured to the upper end of the member 25 and serves to mount a cup-shaped member 27 which receives therewithin in fixed engagement one end of a horizontal tubular member 28 open at its other end. A second elongated tubular member 29 is telescopically received within the tubular member 28, being locked relative thereto by means of the set screw 30, the tubular member 29 in turn receiving through its open end in telescopic manner an elongated rod 31. The rod 31 may be locked relative to the tubular member 29 by means of the set screw 32 and terminates in a hook 33 which engages supportively an eye 34 secured to the central upper portion of a hood 35 adapted to overlie the gratings 22, 22a and 22b whereby to cover the same (Fig. 2). By means of the hook 33 and eye 34, the hood 35 may be interchanged with a larger hood, not shown, adapted to cover the entire barbecue pit 10 and which latter may be rotated away from the pit and above a table or the like to serve as an umbrella, when raining. Such an enlarged hood would also serve to protect the pit 10 from rain.

Thus, the gratings or grills 22, 22a and 22b may be swung in either direction above and away from the barbecue pit 10. It will be noted that the hollow member 14 is positioned relative to the member 12' so as to just support the grill 22 above the pit 11, permitting the latter to swing clear of the pit when desired. When the food upon the grill 22 has been cooked, the food and grill may be rotated above a table or the like provided to one side of the pit. It will also be noted that the telescopic construction 28, 29, 31 permits the supporting of the larger hood over the center of the pit 10 when desired.

While various changes may be made in the detail construction, it shall be understood that such changes shall be within the spirit and scope of the present invention as defined by the appended claim.

What I claim as new and desire to protect by Letters Patent of the United States is:

A device of the class described comprising a substantially vertical standard made up of a plurality of telescopic elements, means for adjusting the vertical position of said telescopic elements relative to each other, a plurality of horizontal tubular elements, means for securing each of said tubular elements at one end to the upper ends of said telescopic elements, an elongated supporting rod within each of said horizontal tubular elements, means for locking the position of each of said supporting rods relative to its respective tubular element, a grill member secured to the free end of each of said supporting rods and adapted to overlie a barbecue pit when rotated thereabove, a hood, and telescopic means for supporting said hood provided by the uppermost of said horizontal tubular members.

References Cited in the file of this patent

UNITED STATES PATENTS

| | | |
|---|---|---|
| 750,742 | Weston | Jan. 26, 1904 |
| 1,452,640 | Hulick | Apr. 24, 1923 |
| 1,666,293 | Lorton | Apr. 17, 1928 |
| 1,844,113 | Beidler et al. | Feb. 9, 1932 |
| 2,173,024 | Park | Sept. 12, 1939 |